US007661063B2

(12) United States Patent
Iwasaki

(10) Patent No.: US 7,661,063 B2
(45) Date of Patent: Feb. 9, 2010

(54) DOCUMENT PROCESSING APPARATUS AND CONTROL METHOD THEREOF

(75) Inventor: Shingo Iwasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 11/250,656

(22) Filed: Oct. 13, 2005

(65) Prior Publication Data

US 2006/0085739 A1 Apr. 20, 2006

(30) Foreign Application Priority Data

Oct. 14, 2004 (JP) ............................ 2004-300279

(51) Int. Cl.
*G06F 17/00* (2006.01)
*G06F 17/20* (2006.01)
*G06F 17/24* (2006.01)

(52) U.S. Cl. ...................... 715/234; 715/200; 715/204; 715/239; 715/243; 715/246

(58) Field of Classification Search ................ 715/200, 715/204, 234, 243, 246, 239
See application file for complete search history.

(56) References Cited

U.S. PATENT DOCUMENTS 6,829,614 B2 * 12/2004 Fujishima et al. ........... 707/101
6,934,052 B2 8/2005 Venable
7,174,327 B2 * 2/2007 Chau et al. ..................... 707/3
7,228,496 B2 * 6/2007 Hamada ..................... 715/255
7,231,386 B2 * 6/2007 Nonomura et al. .......... 715/227
2003/0163285 A1 * 8/2003 Nakamura et al. .......... 702/179
2003/0208473 A1 * 11/2003 Lennon ......................... 707/3
2005/0071364 A1 * 3/2005 Xie et al. .................... 707/102

FOREIGN PATENT DOCUMENTS

JP 2001-109742 4/2001
JP 2002-183116 6/2002

OTHER PUBLICATIONS

Istvan Beszteri and Petri Vuorimaa, "Automatic Layout Generation with XML Wrapping", Springer Berlin/Heidelberg, vol. 2642/2003, pp. 101-107.*
Office Action dated Oct. 5, 2007, concerning the basis Japanese Patent Application No. 2004-300279 and English translation thereof.

* cited by examiner

*Primary Examiner*—Laurie Ries
*Assistant Examiner*—Chau Nguyen
(74) *Attorney, Agent, or Firm*—Cowan, Liebowitz & Latman, P.C.

(57) ABSTRACT

A document processing apparatus has a data exchange processor for inputting plural first structured documents, extracting contents included in the respective first structured documents, and creating second structured documents respectively corresponding to the first structured documents and having a predetermined data structure, a data unification processor for unifying the plural second structured documents into a third structured document, a layout processor for arranging plural rectangles in a predetermined area based on rectangular size information included in the third structured document, and a rendering processor for rendering the contents corresponding to the respective rectangles described in the third structured document.

10 Claims, 10 Drawing Sheets

408
508
510
(a)
(b)
(c)
(d)
(e)
IMAGE A
IMAGE B
IMAGE C
IMAGE D
IMAGE E
aaaaaa
bbbbbb
ccccc
ddddddd
eeeeee

DOCUMENT PROCESSING APPARATUS AND CONTROL METHOD THEREOF

FIELD OF THE INVENTION

The present invention relates to a document processing apparatus and its control method for generating document data where contents respectively included in plural structured documents are arranged.

BACKGROUND OF THE INVENTION

Distribution document data or printable document data is generated by collecting images and texts used in documents as content data forming respective layouts and layouting the collected content data. In this case, necessary various processings including data collection processing and layout processing are tightly unified as one application. Conventionally, upon determination of document layout, an operator manually determines a layout using the substance of data, otherwise, manually generates a template to output those data in a predetermined layout.

U.S. Pat. No. 6,934,052 discloses a technique for enlarging digital images and positioning them so as to minimize blank space on a page.

In a case that various processings including data collection processing and layout processing are tightly unified as one application, the processings cannot be separated. Accordingly, it is impossible to incorporate a part of those processings into a device or a device with a small capacity resource. Further, in a case where layout information is not included, the layout processing cannot be realized without an operator's work. For this reason, layout generation requires much time and trouble, which is a factor of increase in human cost.

Further, the layouting may be performed by generating a template to output content data in a predetermined layout and outputting the content data using the template. However, in this case, as the layouting is performed with only several predetermined patterns, it is difficult to obtain a desired result by dynamically changing the layout in correspondence with the size or the like of input various content data.

SUMMARY OF THE INVENTION

The present invention has been proposed to solve the problems of the conventional art.

The feature of the present invention is to provide a document processing apparatus and its control method to generate a structured document by collecting and layouting plural structured documents each describing image and text as contents and to generate data where the structured document is rendered.

According to an aspect of the present invention, there is provided with a document processing apparatus comprising:

structured document creation means for inputting plural first structured documents, extracting contents included in the plural first structured documents, and creating second structured documents respectively corresponding to the first structured documents and having a predetermined data structure;

unification means for unifying the second structured documents to a third structured document;

layout means for arranging plural areas in a predetermined area based on area information included in the third structured document; and rendering means for rendering the extracted contents corresponding to the respective areas described in the third structured document.

Further, according to other aspect of the present invention, there is provided with a document processing method comprising:

a structured document creation step of inputting plural first structured documents, extracting contents included in the plural first structured documents, and creating second structured documents respectively corresponding to the first structured documents and having a predetermined data structure;

a unification step of unifying the second structured documents to a third structured document;

a layout step of arranging plural areas in a predetermined area based on area information included in the third structured document; and a rendering step of rendering the extracted contents corresponding to the respective areas described in the third structured document.

Other features, objects and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, a preferred embodiment of the present invention will now be described in detail in accordance with the accompanying drawings. Note that the following embodiment does not limit the present invention in the scope of the claims, and further, all the combinations of characteristic features described in the embodiment are not necessarily essential to the solution of the present invention.

In the present embodiment, when plural structured documents having different structures and including different contents are inputted, they are respectively replaced with structured documents which can be subjected to data unification processing, and they are unified to one structured document to be subjected to layout processing and rendering processing. Then the layout processing is performed on the structured document, thereby layout information to determine the layout of the respective contents is determined. The contents are actually arranged based on the layout information, then the document is converted to file data which can be handled by an application program, and the file data is outputted. Further, when an error occurs upon layouting based on the layout information, the layout processing is performed again, and a more appropriate layout is determined.

Figure 1:
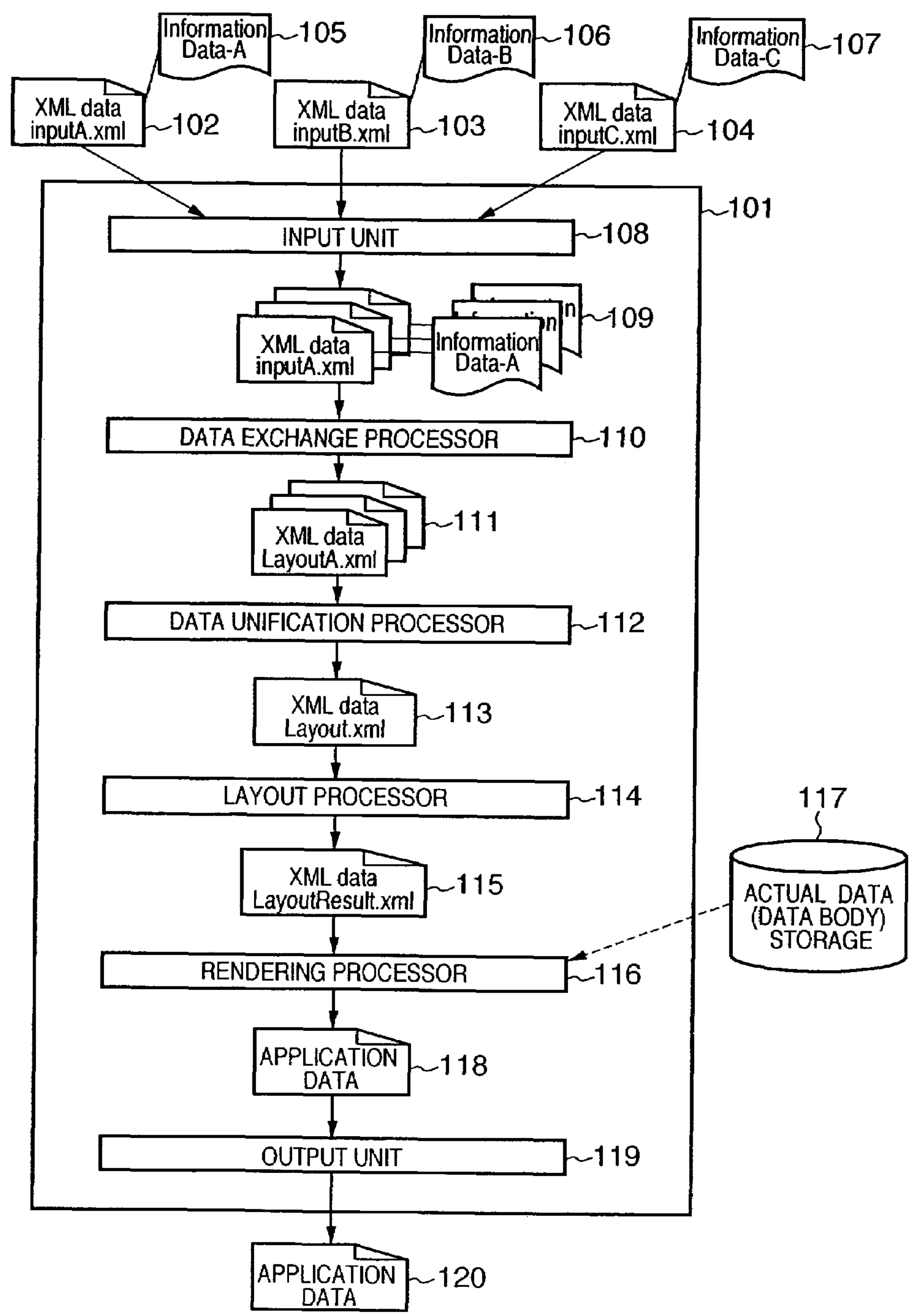
FIG. 1 is a block diagram showing the structural functions of an image processing apparatus according to an embodiment of the present invention.

FIG. 1 is a block diagram showing the structural functions of an image processing apparatus according to the embodiment of the present invention.

In FIG. 1, reference numeral 101 denotes a processing function unit of the image processing apparatus. XML data 102 to 104 are structured documents describing paths to image(s) and text(s) as content data. "inputA.xml", "inputB.xml" and "inputC.xml" are XML data having different structures, respectively.

InformationData-A 105, InformationData-B 106 and InformationData-C 107 are data (Data-A, Data-B and Data-C) describing data layout information of XML data accompanying the respective XML data. Each of XML data 102 to 104 and its corresponding InformationData are referred to as XML data 109.

When the respective XML data 109 are inputted into an input unit 108, processing is started. A data exchange processor 110 receives the XML data 109 and analyzes the data. At this time, the data exchange processor 110 extracts necessary data utilizing the InformationData, converts the extracted data to XML data structures analyzable by the subsequent-stage processing, and supplies the data as XML data 111 (LayoutA.xml, LayoutB.xml and LayoutC.xml) to a data unification processor 112. The data unification processor 112 unifies plural XML data 111 to one XML data structure analyzable by the subsequent-stage processing, and supplies the data as XML data 113 (Layout.xml) to a layout processor 114.

The layout processor 114 extracts necessary rectangular information from the XML data 113, arranges the rectangular information at random in a predetermined area, and performs processing using an optimization algorithm to obtain an optimum result of layouting. The layout processor 114 describes the result in XML data 115 (LayoutResult.xml) and supplies the data to a rendering processor 116. The rendering processor 116 extracts necessary information (paths to texts and images) from the XML data 115, and obtains actual image data (image data body) from a actual data (data body) storage 117. Then the rendering processor 116 draws these data in accordance with the layout determined by the layout processor 114, and generates the result of processing as application data (PDF, SVG, XHTML or the like) 118. The application data 118 is supplied to an output unit 119. The output unit 119 outputs finally-completed application data 120.

Next, the details of processings by the respective processors in the functional block diagram of FIG. 1 will be described.

Figure 2:
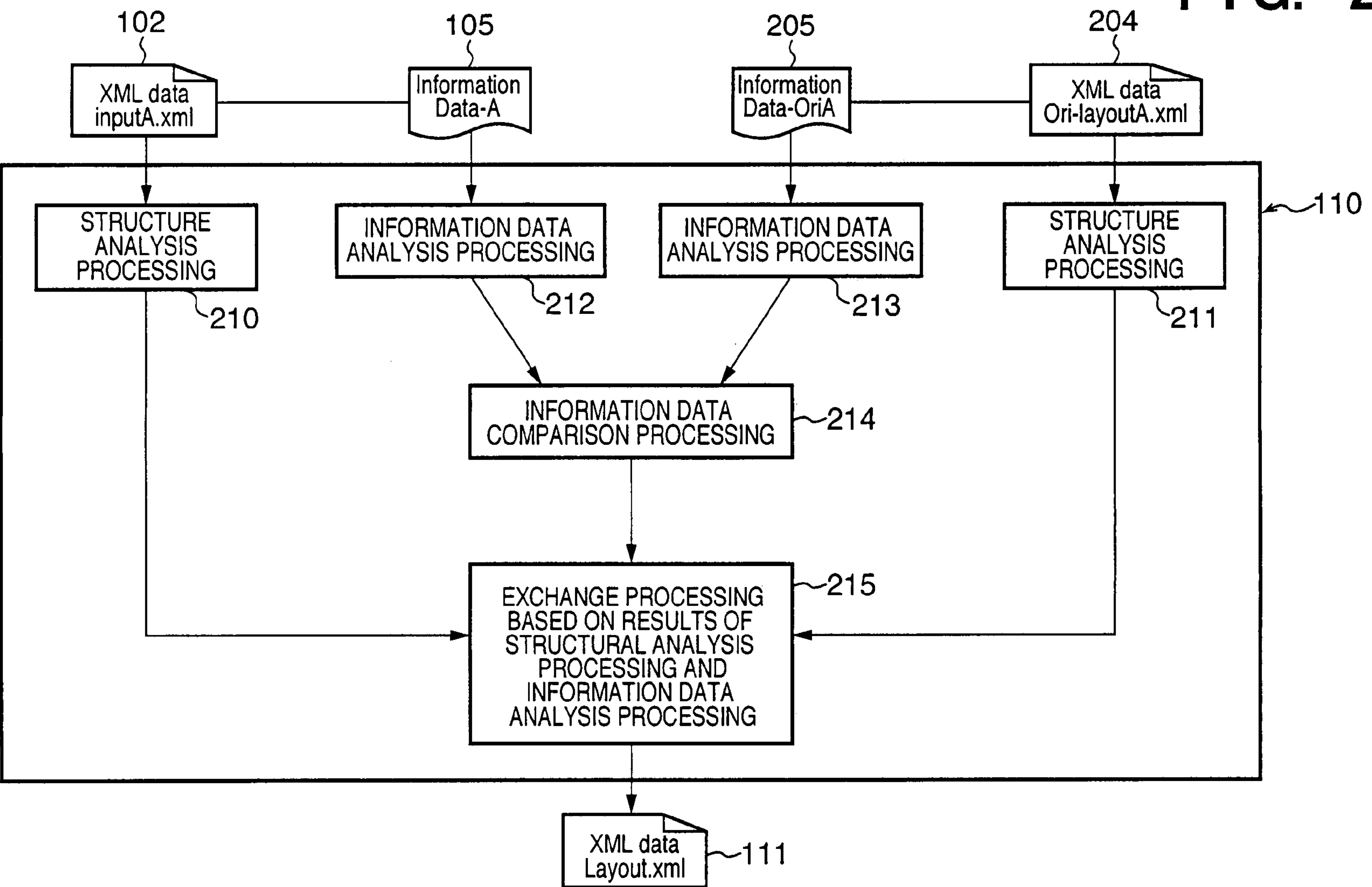
FIG. 2 is a block diagram showing processing by a data exchange processor according to the embodiment.
Figure 3:
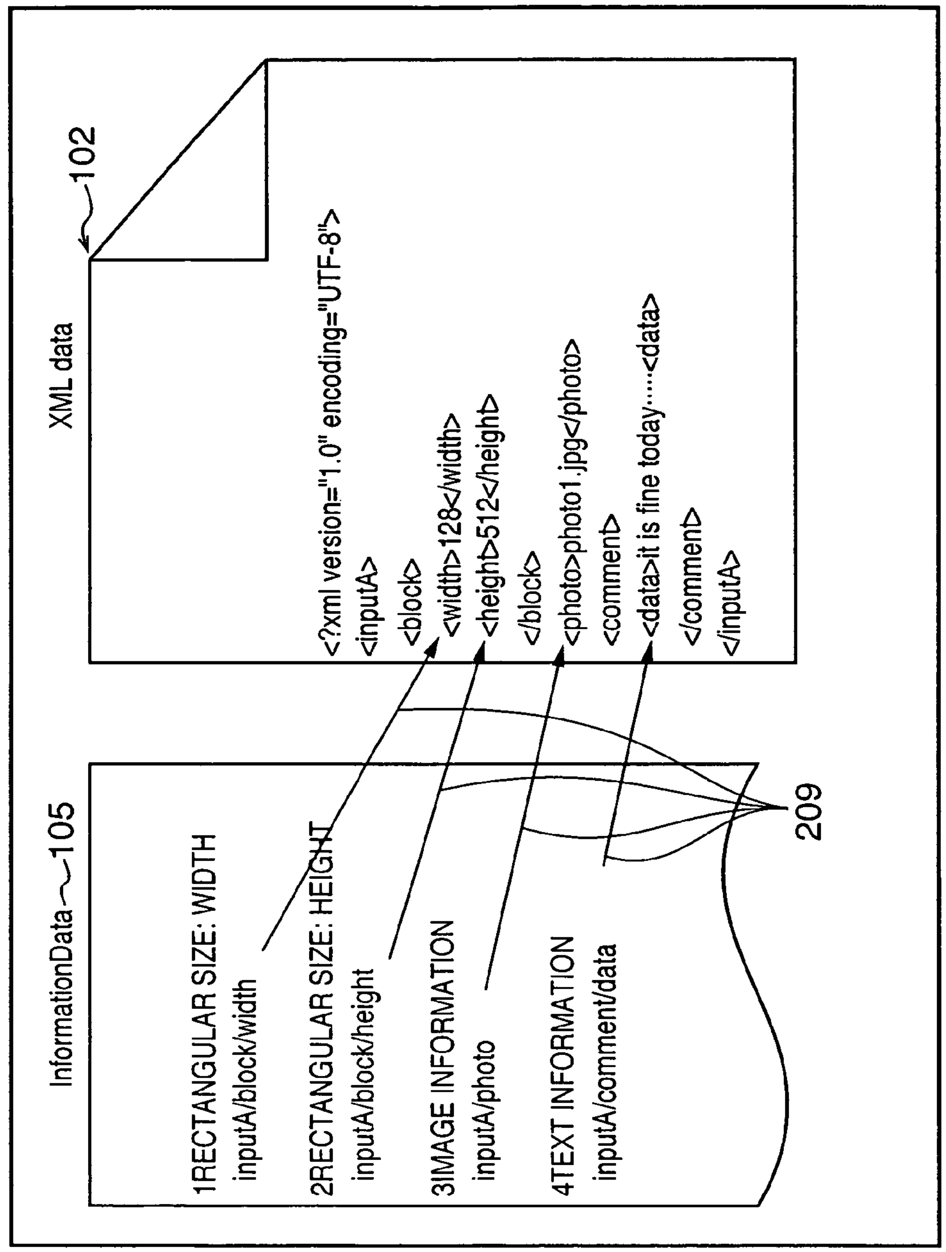
FIG. 3 depicts a view illustrating a particular example of InformationData-A and the relation between the InformationData-A and XML data according to the present embodiment.

FIG. 2 is a block diagram showing the contents of processing by the data exchange processor 110 according to the embodiment. FIG. 3 illustrates a particular example of the InformationData and the relation between the InformationData and XML data. Hereinbelow, the processing by the data exchange processor 110 will be described with reference to FIGS. 2 and 3. In FIGS. 2 and 3, the XML data "inputA.xml" 102 and InformationData-A 105 are processed. Further, the other XML data 103, 104 and InformationData-B 106 and InformationData-C 107 are similarly processed.

In FIG. 2, the XML data 102 and the InformationData-A 105 correspond to the XML data (109 in FIG. 1) received from the input unit 108. The InformationData (Data-A) 105 indicates a tag to handle data information of the XML data 102 required in the subsequent processing. Further, XML data (Ori-LayoutA.xml) 204 indicates XML data (form) as a basis of XML format data to define a basic layout of the XML data (inputA.xml) 102. The XML data 111 indicating the layout of the XML data 102 is generated in correspondence with the format of the XML data 204. InformationData-OriA 205 is InformationData of the XML data (Ori-LayoutA.xml) 204.

FIG. 3 depicts a particular example of the InformationData-A 105 and an example of the relation between the Information-Data-A 105 and the XML data 102 according to the present embodiment.

The InformationData-A 105 has four items, i.e., the 1st item "rectangular size: width", the 2nd item "rectangular size: height", the 3rd item "image information", and the 4th item "text information". A path XPATH 209 indicates tag positions of the XML data 102 to respectively handle the related item data of the InformationData-A 105.

In this example, as the path of the 1st item "rectangular size: width" is "inputA/block/width", and indicates that the item relates to an element "width" in a tag "block" of the XML data (inputA.xml) 102. When the data is to be extracted from the XML data 102, the extraction is made from the location, while when data is to be inserted into the XML data 102, the data is to be inserted in the location.

The structures of the XML data 102 and 204 are analyzed by corresponding structure analysis processings 210 and 222. That is, the structure analysis processing sequentially reads the structure of the XML data from root tags, and determines a tag name, a value between tags, an attribute of the tag, the value of the attribute, tag parent-child relation, tag brother relation and the like, and holds these data as table data.

Further, the InformationData-A 105 and the Information-Data-OriA 205 are respectively analyzed by InformationData analysis processings 212 and 213. The InformationData analysis processing obtains data extraction location and data insertion location based on the above-described XPATH 209. InformationData comparison processing 214 determines a location of the XML data (LayoutA.xml) 204 into which data extracted from the XML data (inputA.xml) 102 is inserted, based on the results of analysis of the corresponding InformationData-A 105 and the InformationData-OriA 205. Thus, the necessary data included in the XML data 102 (inputA.xml) are imported to the XML data 204 (Ori-LayoutA.xml) based on the result of analysis of the XML data, and by exchange processing 215 based on the Information-Data analysis processing, thereby the XML data 111 (LayoutA.xml) including the necessary data is generated and outputted. The above processing is performed on the respective XML data 102 to 104 inputted to the input unit 108.

Figure 4A:
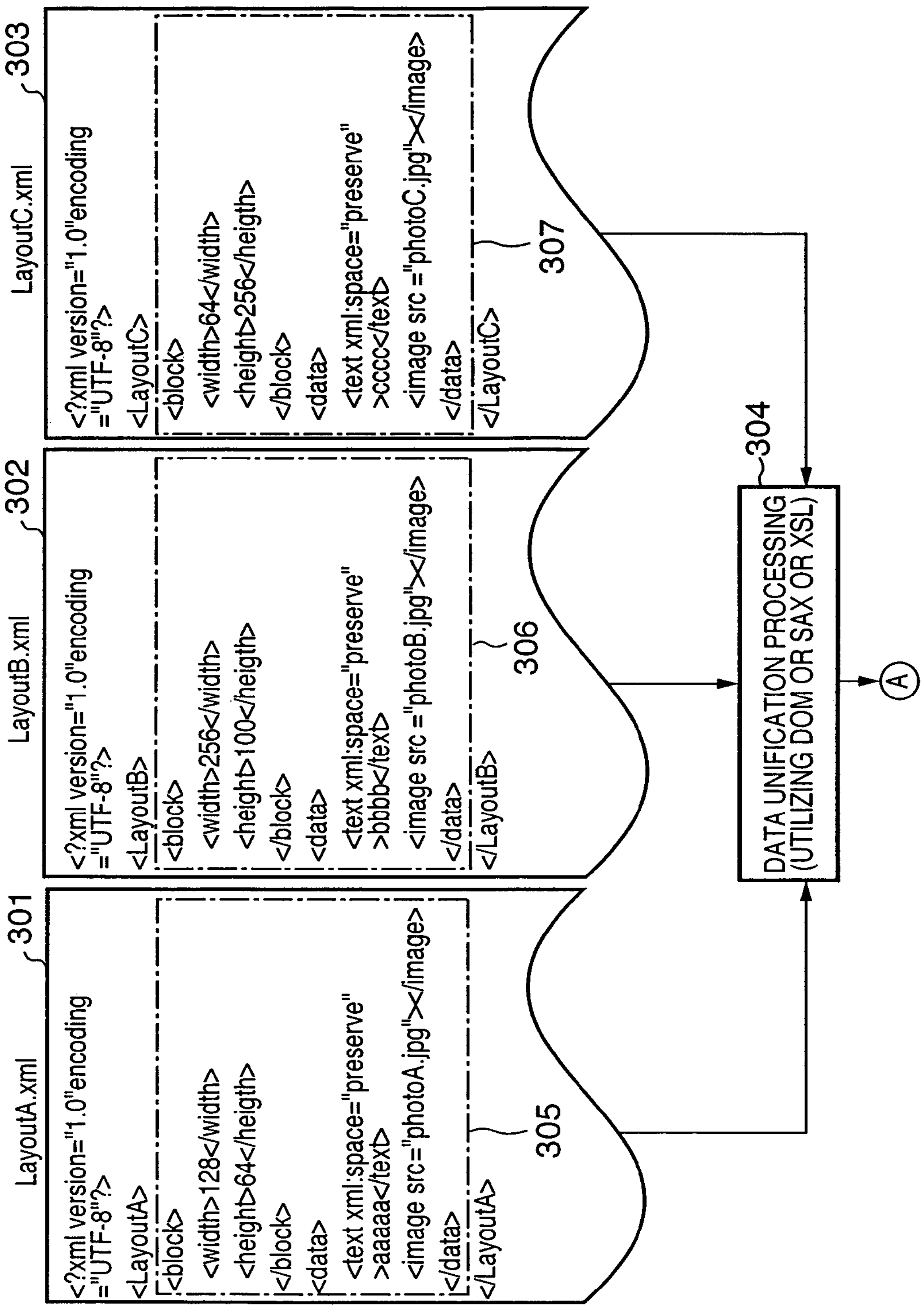
FIGS. 4A and 4B depict a view illustrating a particular example of unification of the XML data in a data unification processor according to the present embodiment.
Figure 4B:
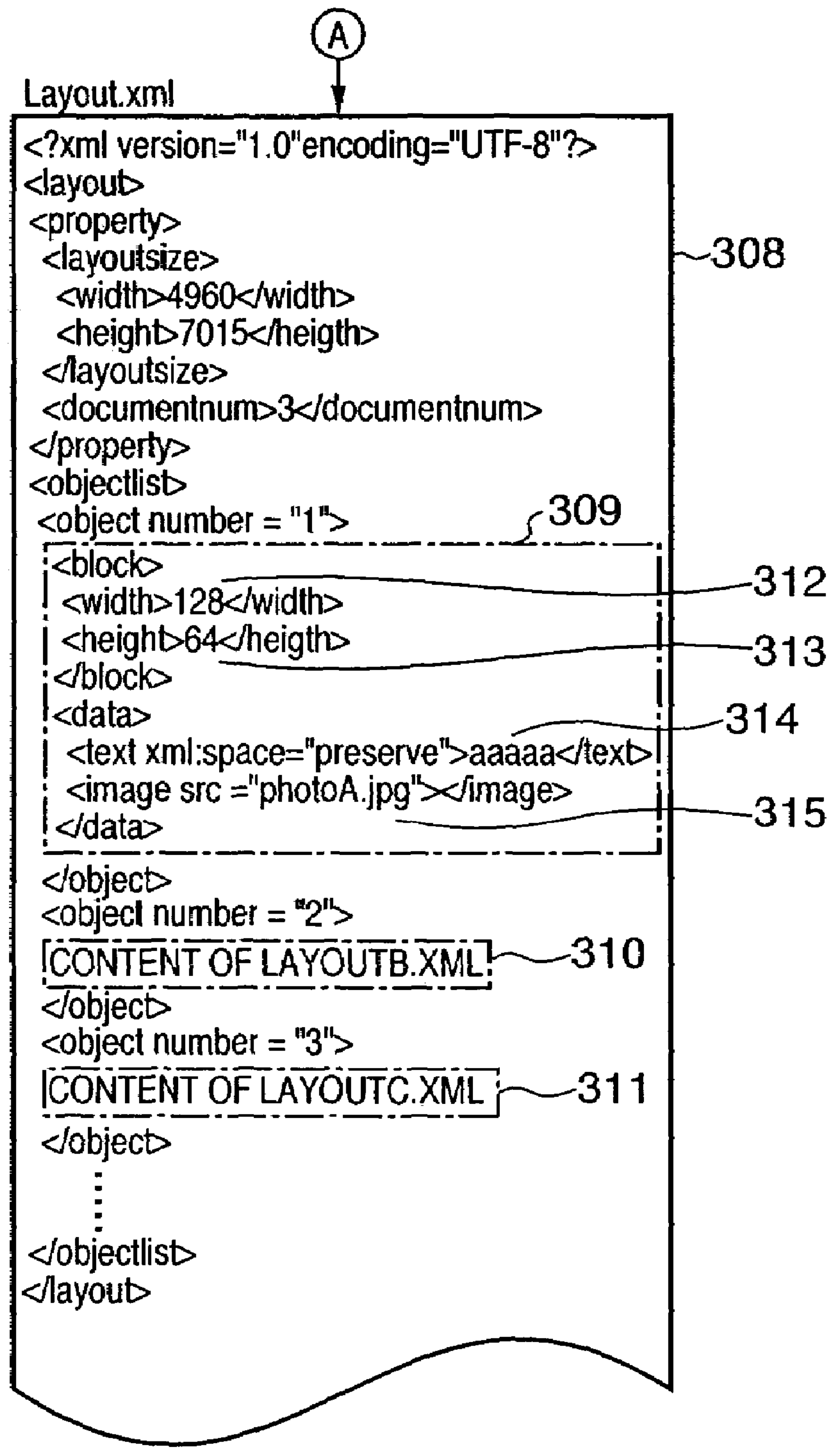

FIGS. 4A and 4B depict a view illustrating a particular example of unification of the XML data in the data unification processor 112 according to the present embodiment.

In FIGS. 4A and 4B, numeral 301 to 303 denote XML data (LayoutA.xml, LayoutB.xml and LayoutC.xml) having only necessary data included in the XML data (inputA.xml, inputB.xml and inputC.xml), generated by the data exchange processor 110. Data unification processing 304 (corresponding to the data unification processor 112 in FIG. 1) inputs the XML data 301 to 303, and generates XML data 308 (Layout.xml) (corresponding to the XML data 113 in FIG. 1)

having a structure analyzable to the subsequent-stage layout processor 114, using a DOM- or SAX-utilizing programming or using XSLT. In this example, the structure in the areas 305 to 307 in the XML data 301 to 303 are inserted as an <objectlist> into the XML data 308 (Layout.xml).

In the XML data 308, the contents 305 to 307 of the LayoutA, LayoutB and LayoutC corresponding to the XML data 301 to 303 are described in areas 309 to 311. A description 312 corresponds to the rectangular size: width "128" included in the LayoutA; a description 313, to the rectangular size: height "64" included in the LayoutA; a description 314, to text information "aaaaa" included in the LayoutA; and a description 315, to information "photoA.jpg" included in the LayoutA. Thus, the plural XML data are unified into one XML data (Layout.xml).

Figure 5:
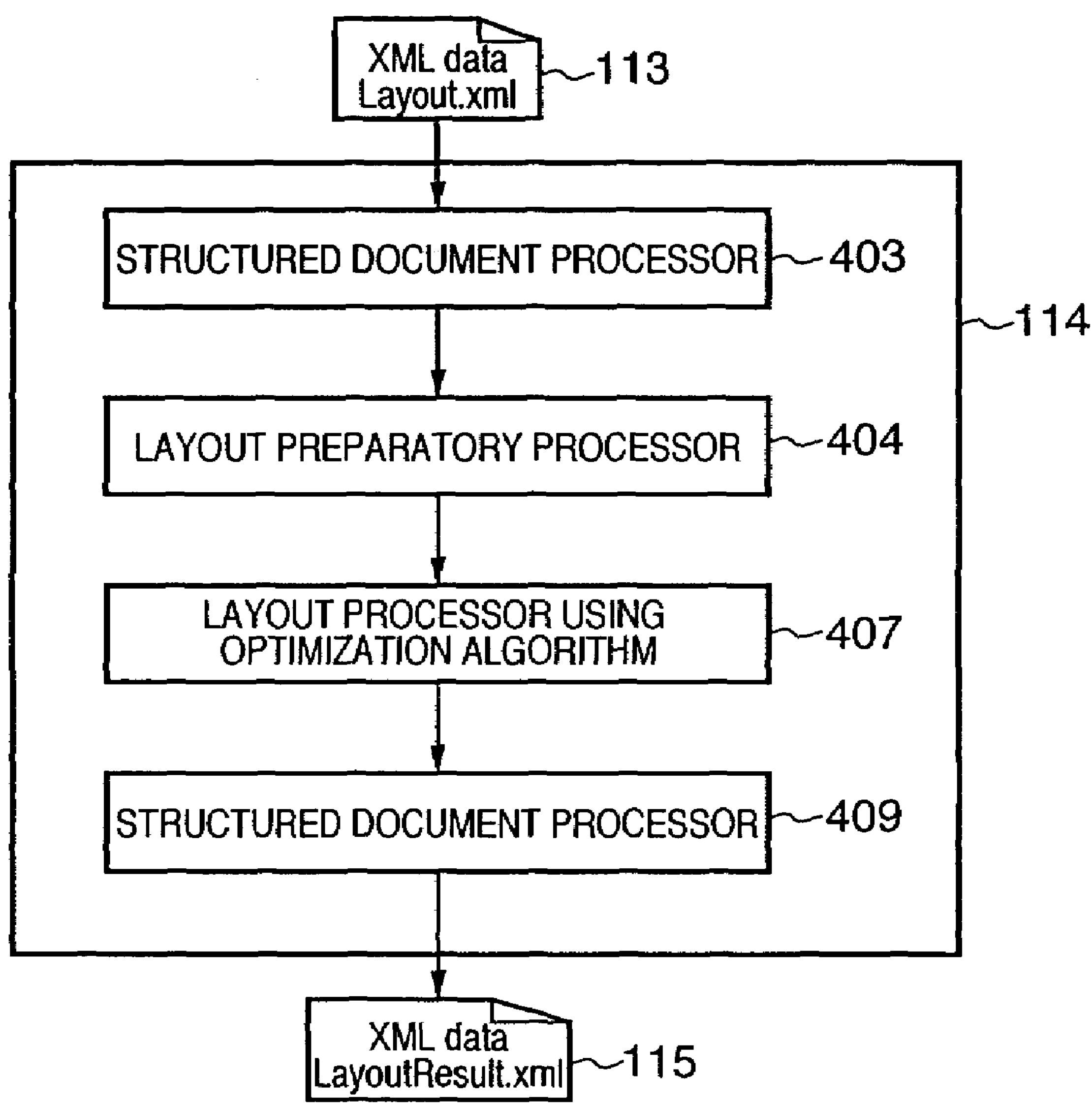
FIG. 5 is a block diagram showing processing by a layout processor according to the present embodiment.
Figure 6:
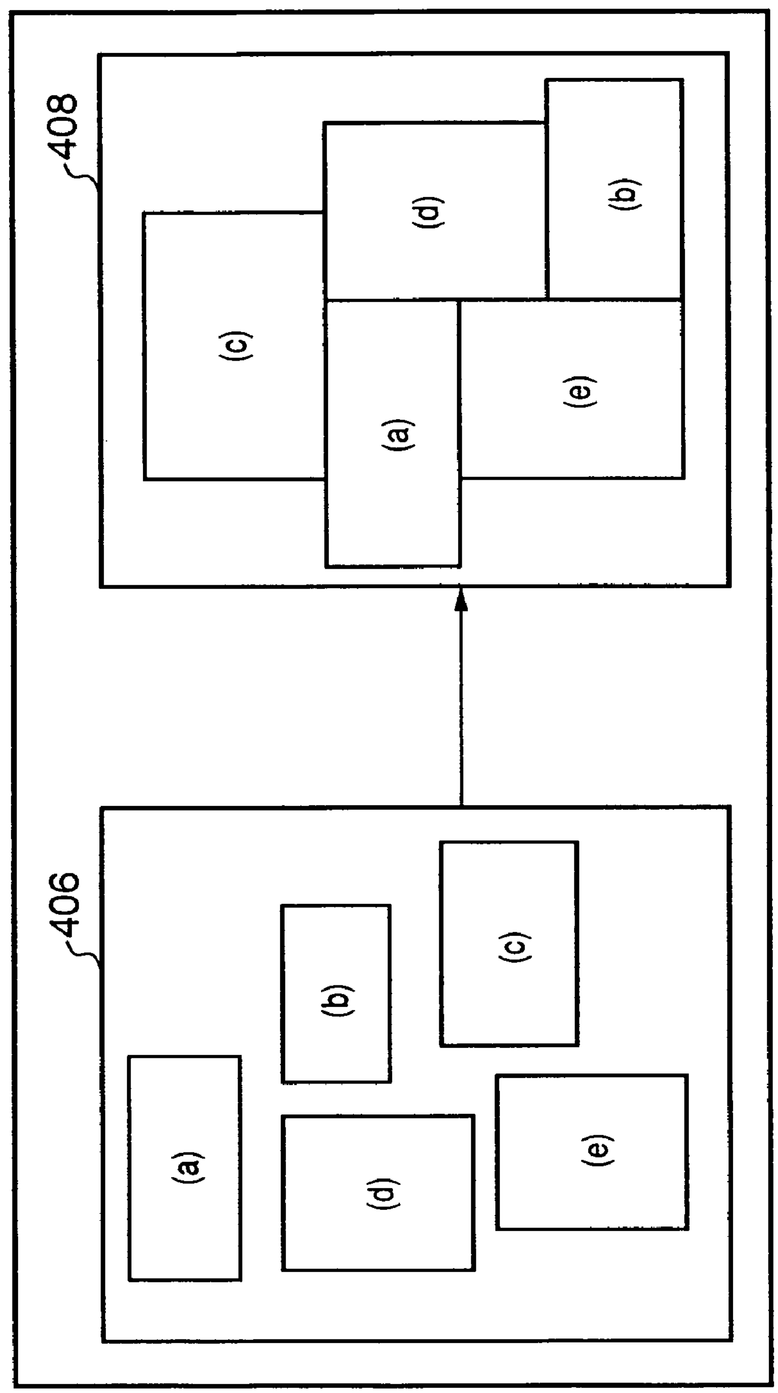
FIG. 6 depicts a view illustrating a particular example of processing by a layout preparatory processor and the layout processor based on an optimization algorithm according to the present embodiment.

FIG. 5 is a block diagram showing processing by the layout processor 114 according to the present embodiment. FIG. 6 illustrates a particular example of the processing by the layout processor 114. Hereinbelow, the processing will be described with reference to FIGS. 5 and 6.

In FIG. 5, the XML data (Layout.xml) 113 outputted from the data unification processor 112 is the XML data unified from plural data by the data unification processor 112. A structured document processor 403 reads the XML data 113 and extracts rectangular size information. A layout preparatory processor 404 performs processing to determine a layout of plural rectangles included in the XML data 113 based on the rectangular size information extracted by the structured document processor 403.

FIG. 6 depicts a view illustrating a particular example of processing by the layout preparatory processor 404 and a layout processor 407 based on an optimization algorithm according to the present embodiment.

In FIG. 6, numeral 406 denotes a random arrangement of respective rectangles (a) to (e) in an area based on the rectangular size information extracted by the structured document processor 403. Numeral 408 denotes the result of centering processing by respectively moving the rectangles (a) to (e) in an enlargement, reduction, leftward, rightward, upward or downward direction by layout processing using an optimization algorithm by the layout processor 407. Thus an optimum layout where the rectangles are centered without gap and within a predetermined area, is obtained. As the optimization algorithm, Simulated Annealing or genetic algorithm may be employed.

Note that FIG. 6 shows layout processing by centering, however, various layouts such as arrangement of rectangles along inside perimeter of an area and arrangement of rectangles from an upper-left position, as well as centering, can be determined and layout processing can be performed in accordance with the layout.

The structured document processor 409 inputs the optimum layout obtained by the layout processor 407 by the optimization algorithm, forms the data as XML data (LayoutResult.xml) 115 and outputs the data.

Figure 7:
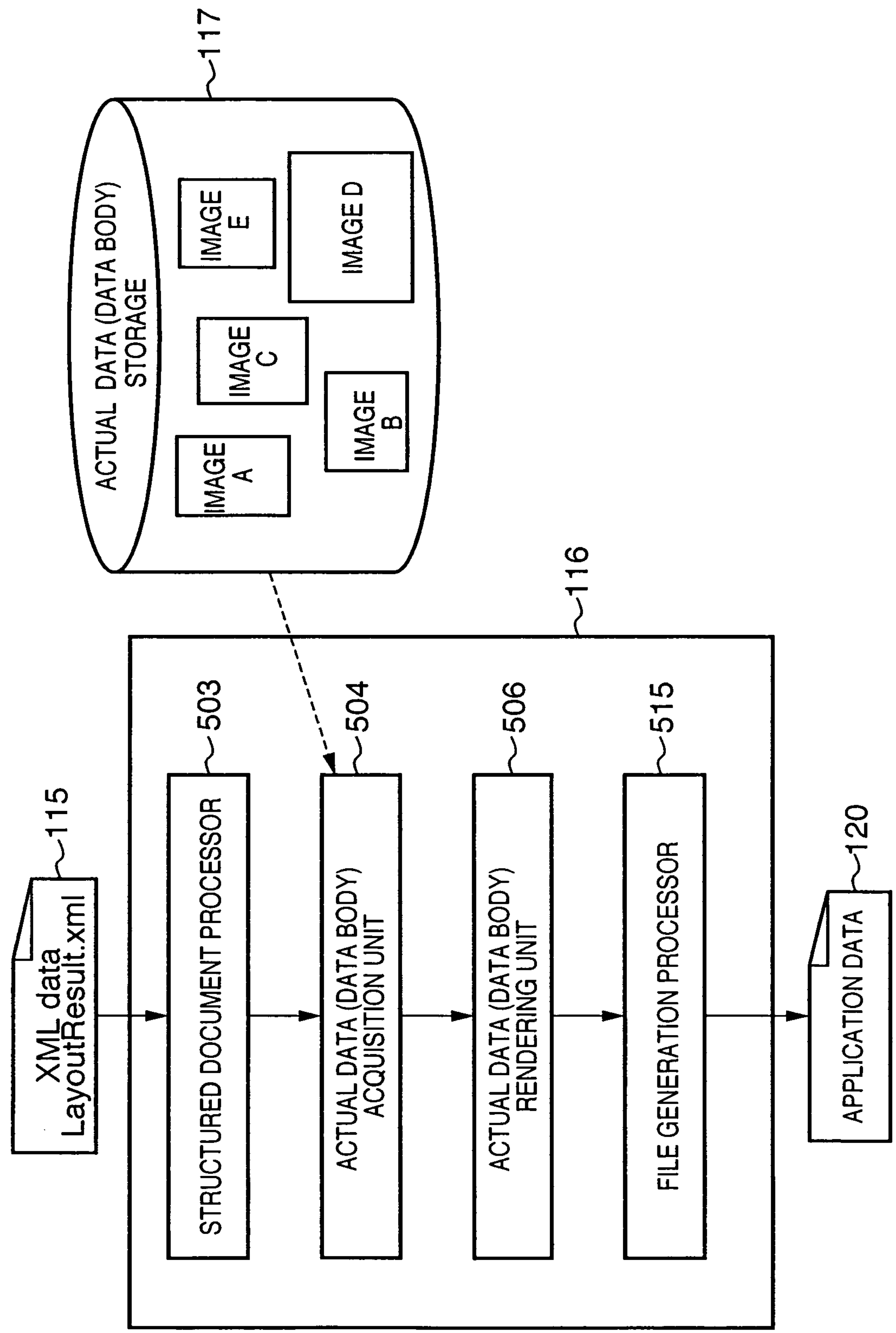
FIG. 7 is a block diagram showing processing by a rendering processor according to the present embodiment.

FIG. 7 is a block diagram showing processing by the rendering processor 116 according to the present embodiment.

Figure 8:
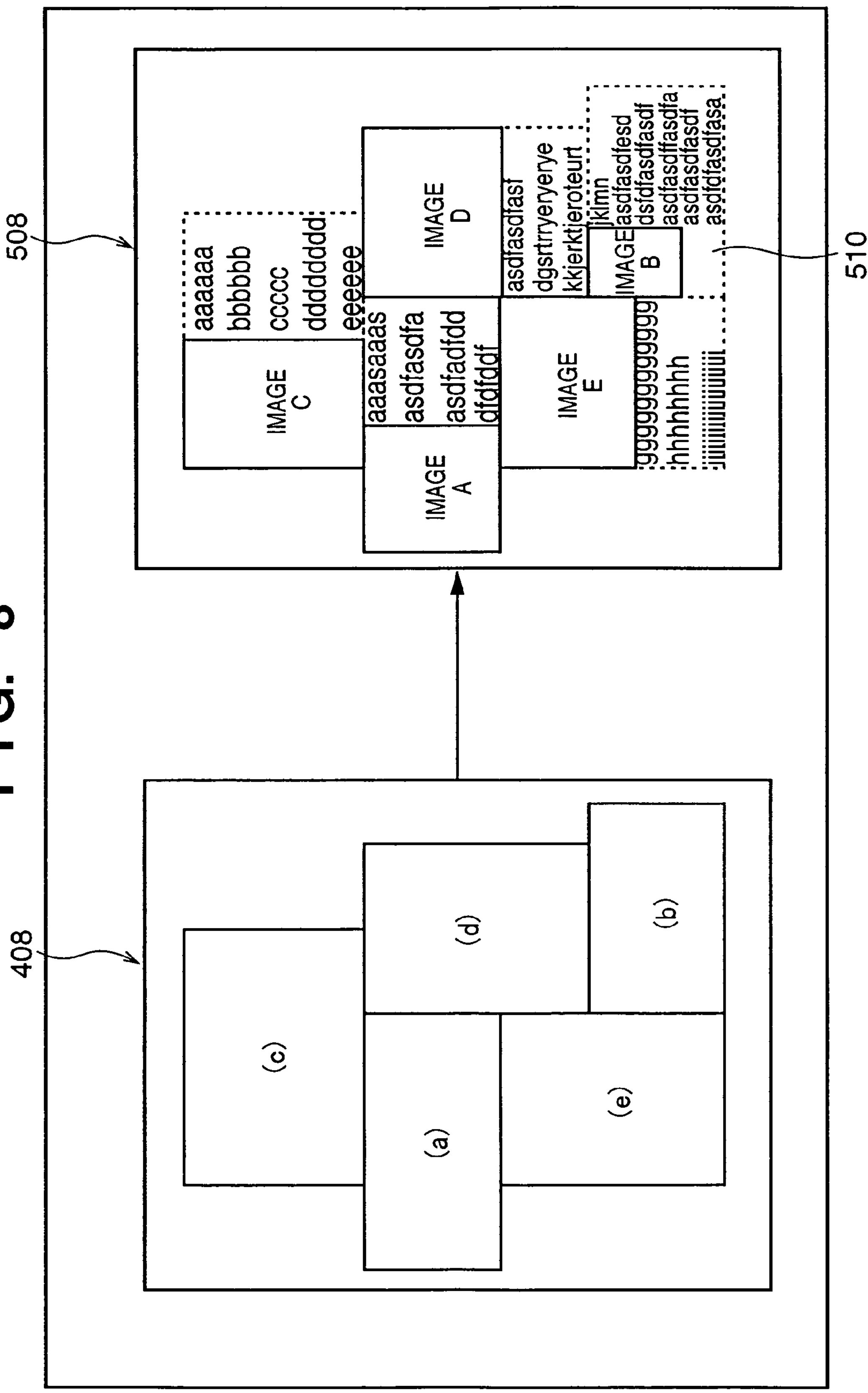
FIG. 8 depicts a view illustrating a particular example of rendering processing by the rendering processor according to the present embodiment.
Figure 9:
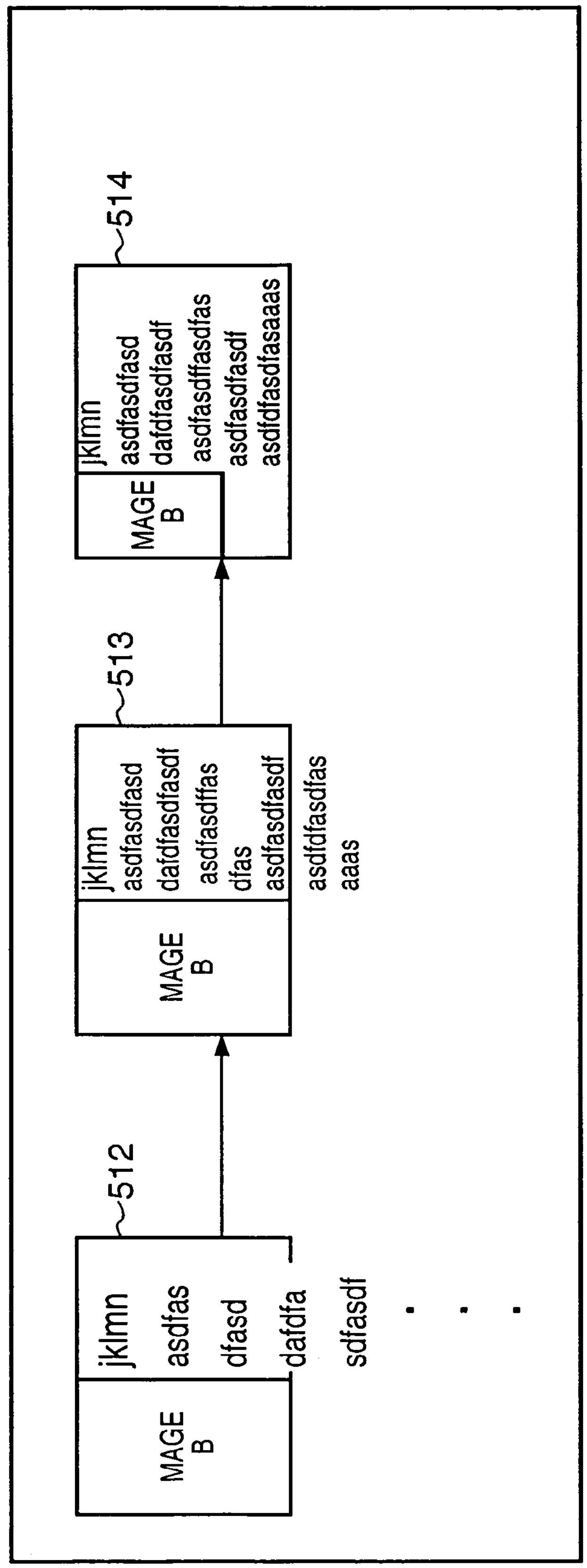
FIG. 9 depicts a view illustrating an example of processing by the rendering processor according to the present embodiment.

FIG. 8 depicts a view illustrating a particular example of the processing by the rendering processor 116. Further, FIG. 9 depicts a view illustrating a particular example of rendering processing on contents within a rectangle. Next, the processing by the rendering processor 116 according to the present embodiment will be described with reference to FIGS. 7 to 9.

In FIG. 7, the XML data 115 outputted from the layout processor 114 corresponds to the XML data (LayoutResult.xml) describing the result of layouting. In the rendering processor 116, a structured document processor 503 reads the input XML data 115, and reads layout information and paths to text and image data as content data to be subjected to actual rendering, described in the XML data. A actual data (data body) acquisition unit 504 utilizes the paths to obtain image data corresponding to the respective rectangular areas from the actual data storage 117, and obtains all the data for rendering. The rendering processor 506 performs rendering processing based on the obtained actual data (data body).

FIG. 8 illustrates a particular example of the rendering processing by the rendering processor 506. As indicated with a layout result 508 from the layout result 408 obtained by the layout processor 114, images A to E and texts (English character strings in FIG. 8) are sequentially inserted into corresponding rectangles (a) to (e) by image enlargement/reduction and/or increasing/reducing text font size. Especially regarding the insertion of the image B into the rectangle (b) as indicated with numeral 510, rendering is performed in accordance with the procedure shown in FIG. 9.

FIG. 9 illustrates an example of the processing by the rendering processor 506 according to the present embodiment.

Numeral 512 indicates, as a result of insertion of text having a large number of characters into a rectangle (b), a state where the text protrudes from the lower side of a rectangle (b). Numeral 513 indicates the result of insertion by changing the font size of the text to a minimum font size. Also the text which is not fit in the rectangle (b) protrudes from the lower side of the rectangle. Numeral 514 indicates the result of insertion by further reducing the image B, expanding an area to draw the text in the rectangle (b), and then again inserting the text in the minimum font size the same as that in the case of the result 513. In the result 514, the image B and the text are fitted in the rectangle (b). Thus, rendering regarding the rectangle (b) is completed.

In this manner, in the respective layouted rectangles, rendering is performed so as to arrange images and texts in a balanced manner. A file generation processor 515 (FIG. 7) forms the final data resulted from the rendering as application data 120 and outputs the data. As a particular example of the application data 120, data in the format of PDF, XHTML, SVG or the like may be employed.

As described above, according to the present embodiment, plural structured documents are inputted and application data where contents included in the structured documents are arranged in a desired layout can be generated.

Note that in the above embodiment, it may be arranged such that in a case where an unintended result is obtained from layouting by the layout processor 114, a desired layout is obtained by repeating the layout processing by the layout processor 114 instead of repeating the entire processing as shown in FIG. 1.

Further, in the rendering processing described in the above embodiment, rendering is performed on contents as a combination of image(s) and text(s), however, the present invention is not limited to such combined contents. The rendering can be similarly performed on single content data such as image or text.

As described above, according to the present embodiment, in the flow of processing from collection of content data through automatic layouting to data output, as fragmented processings are individually performed, even a change of content data itself in the middle of processing does not influence layout processing. Further, as a dynamically optimized layout is determined from content data, any human task does not occur upon layout generation, and the costs can be reduced. Further, structured documents generated for various purposes can be applied to the conventional document solutions including scrap processing of newspaper and the like.

Other Embodiment

As described above, the object of the present invention can also be achieved by providing a storage medium holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Further, the storage medium, such as a floppy (registered trademark) disk, a hard disk, an optical disk, a magneto-optical disk, a CD-ROM, a CD-R, a DVD, a magnetic tape, a non-volatile type memory card, and ROM can be used for providing the program code. Further, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

The present invention is not limited to the above embodiments and various changes and modifications can be made within the spirit and scope of the present invention. Therefore, to appraise the public of the scope of the present invention, the following claims are made.

CLAIM OF PRIORITY

This patent application claims priority from Japanese Patent Application No. 2004-300279 filed on Oct. 14, 2004, which is hereby incorporated by reference.

What is claimed is:

1. A document processing apparatus comprising:

a computer having structured document creation means for inputting plural first structured documents and first data, extracting contents and area information which is included in the plural first structured documents and is designated by the first data, and converting each of the plural first structured documents into a corresponding second structured document by inserting the contents and area information extracted from each of the plural first structured documents into a model structured document at a location designated by second data;

computer implemented unification means for unifying the plural second structured documents as a third structured document, wherein each of the plural second structured documents is converted from the each of the plural first structured documents, and the third structured document includes the extracted contents and the area information inserted in the plural second structured documents;

computer implemented layout means for arranging plural areas within a predetermined area based on the area information included in the third structured document; and computer implemented rendering means for rendering the contents included in the third structured document in the plural areas arranged by the layout means.

2. The document processing apparatus according to claim 1, wherein said unification means creates the third structured document by using a programming utilizing DOM or SAX or using XSLT.

3. The document processing apparatus according to claim 1, wherein said layout means arranges the plural areas by utilizing an optimization algorithm.

4. The document processing apparatus according to claim 1, wherein upon rendition of the contents included in the respective areas, if the visualized data cannot be fit in the area, said rendering means reduces at least one of object data included in the contents.

5. A document processing method comprising:

a structured document creation step of inputting plural first structured documents and first data, extracting contents and area information which is included in the plural first structured documents and is designated by the first data, and converting each of the plural first structured documents into a corresponding second structured document by inserting the contents and area information extracted from each of the plural first structured documents into a model structured document at a location designated by second data, wherein said unification step is executed by a computer;

a unification step of unifying the plural second structured documents as a third structured document, wherein each of the plural second structured documents is converted from the each of the plural first structured documents, and the third structured document includes the extracted contents and the area information inserted in the plural second structured documents, wherein said unification step is executed by a computer;

a layout step of arranging plural areas within a predetermined area on a display unit, based on the area information included in the third structured document, wherein said layout step is executed by a computer; and a rendering step of rendering contents included in the third structured document in the plural areas arranged in the layout step, wherein said rendering step is executed by a computer.

6. The document processing method according to claim 5, wherein in said unification step, the third structured document is created by using a programming utilizing DOM or SAX or using XSLT.

7. The document processing method according to claim 5, wherein in said layout step, the plural areas are arranged by utilizing an optimization algorithm.

8. The document processing method according to claim 5, wherein in said rendering step, upon visualization of the contents included in the respective areas, if the visualized data cannot be fit in the area, at least any one of object data included in the contents is reduced.

9. A storage medium for storing a program for causing a computer to implement document processing, the program comprising:

a structured document creation step of inputting plural first structured documents and first data, extracting contents and area information which is included in the plural first structured documents and is designated by the first data, and converting each of the plural first structured documents into a corresponding second structured document by inserting the contents and area information extracted from each of the plural first structured documents into a model structured document at a location designated by second data;

a unification step of unifying the plural second structured documents as a third structured document, wherein each of the plural second structured documents is converted from the each of the plural first structured documents, and the third structured document includes the extracted contents and the area information;

a layout step of arranging plural areas within a predetermined area based on the area information included in the third structured document; and a rendering step of rendering contents included in the third structured document in the areas arranged in the layout step.

10. The medium according to claim 9, wherein in the rendering step, upon visualization of the contents included in the respective areas, if the visualized data can not be fit in the area, at least any one of object data included in the contents is reduced.

* * * * *